United States Patent [19]

Yamada

[11] Patent Number: 5,092,284
[45] Date of Patent: Mar. 3, 1992

[54] CONTROL VALVE ARRANGEMENT FOR ENGINE

[75] Inventor: Tetsuro Yamada, Iwata, Japan

[73] Assignee: Yamaha Hatsudoki Kabushiki Kaisha, Iwata, Japan

[21] Appl. No.: 580,117

[22] Filed: Sep. 10, 1990

[51] Int. Cl.⁵ .......................................... F02M 35/10
[52] U.S. Cl. .................................. 123/52 MB; 123/323
[58] Field of Search ........ 123/52 M, 52 MV, 52 MC, 123/52 MB, 323

[56] References Cited

U.S. PATENT DOCUMENTS

| | | | |
|---|---|---|---|
| 4,354,464 | 10/1982 | Fujita | 123/323 |
| 4,393,831 | 7/1983 | Bergmann et al. | 123/323 |
| 4,548,166 | 10/1985 | Gest | 123/52 M |
| 4,727,829 | 3/1988 | Kondo et al. | 123/52 MB |
| 4,759,320 | 7/1988 | Fujii et al. | 123/52 MB |
| 4,829,942 | 5/1989 | Ampferer | 123/52 MV |
| 4,898,125 | 2/1990 | Ampferer | 123/52 MC |
| 4,919,087 | 4/1990 | Ogami et al. | 123/52 MV |
| 4,957,071 | 9/1990 | Matsuo et al. | 123/52 MV |
| 5,005,534 | 9/1991 | Washizu et al. | 123/52 M |

FOREIGN PATENT DOCUMENTS

| | | | |
|---|---|---|---|
| 0344706 | 12/1989 | European Pat. Off. | 123/52 M |
| 0101535 | 6/1984 | Japan | 123/52 M |

*Primary Examiner*—David A. Okonsky
*Attorney, Agent, or Firm*—Ernest A. Beutler

[57] ABSTRACT

An improved control valve arrangement for an internal combustion engine that includes a staged, separately tuned induction system and an exhaust system that contains an exhaust control valve. The exhaust control valve is adjusted to provide different reflective areas for the exhaust system under conditions when each of the separately tuned induction systems is operating outside of its peak efficiency point so as to improve the torque curve of the engine.

18 Claims, 4 Drawing Sheets

CONTROL VALVE ARRANGEMENT FOR ENGINE

BACKGROUND OF THE INVENTION

This invention relates to a control valve arrangement for an engine and more particularly to an improved control valve arrangement for an engine, a tuned induction system for an engine and an improved air inlet arrangement for an engine.

It is well known that, as with many other components of an internal combustion engine, the induction system is designed and tuned so as to provide optimum performance under certain running conditions. As such, optimum performance cannot be enjoyed under all running conditions. In order to broaden the range of optimum performance of an engine, it has been proposed to provide a dual or staged induction system for the engine having a relatively long inlet passage that serves the low speed running of the engine and a relatively short induction passage that serves the high speed running of the engine. A wide variety of such dual induction systems have been proposed.

For the most part, these dual induction systems employ a control valve arrangement for selecting whether the long or the short intake passages supply the engine during certain phases of running. Although these arrangements provide an improvement in the performance of the engine at least at the two ranges for which the induction passages are tuned, the torque curve of the engine is not as smooth as could be desired. For example, FIG. 1 of the drawings shows torque curve in broken lines for an engine constructed in accordance with a prior art type of construction. It should be noted that the torque curve has two components, the portion B1 and the portion B2. The portion B1 is the torque curve generated by the long low speed induction passage, while the curve B2 is that generated by the short high speed passage. Not only is there a dip in the point where these two curves cross but also the curves have a generally irregular configuration since the induction passage provides peak performance only at a relatively narrow range for which it was turned (The speeds R1 and R2).

It is, therefore, a principal object of this invention to provide an improved control valve arrangement for an engine that will improve the torque curves throughout the entire load speed range of the engine and not just for certain isolated speed conditions.

It is a further object of this invention to provide a control valve arrangement for an engine in which an effective torque curve is provided throughout the entire speed and load ranges with minimum dips in the curve.

In conjunction with the control valves for the induction system of the type previously described, it has been the conventional practice to use butterfly or pivoted type valves. These valves normally communicate the engine intake port with one of two different lengths intake passages. Since valve arrangements become quite complicated and add to the complexity of the induction system due to the use of two separate passages for each intake port of the engine.

It is, therefore, a still further object of this invention to provide an improved control valve arrangement for the induction system of an engine which permits the use variable length intake passages while simplifying the overall construction.

It is a further object of this invention to provide an improved slide type valve for a compound engine induction system that selectively changes the effective length of the system without requiring multiple parallel induction passages.

Although compound induction systems of the type described are effective in increasing the engine performance over a wider range of its running characteristics, these systems tend to become rather complex, as afore noted. These presents certain difficulties, particularly when the engine is positioned in the engine compartment of modern motor vehicle. It is, of course, desireable to provide a low hood line for the motor vehicles so as to improve streamlining, lessen wind resistance and improve economy. However, it is not always possible to do this with the prior art-type of induction systems due to their complexity.

It is, therefore, a further objection of this invention to provide an inlet device for the induction system of an engine which permits turning over wider ranges and nevertheless affords a compact construction.

SUMMARY OF THE INVENTION

A first feature of the invention is adapted to be embodied in a control valve arrangement for improving the performance of an internal combustion engine comprising an induction system for the engine comprising at least two separately turned intake means each tuned to provide improved induction efficiency at a different engine speed. Induction throttle valves means are provided for controlling which of the intake means serves the engine. The engine also has an exhaust system and exhaust control valve means in the exhaust system for providing selective reflective effect in the exhaust system. Control means operate the exhaust control valve means to optimize performance depending upon the condition of the induction throttle valve means.

Another feature of the invention is adapted to be embodied in an tuned induction system for an internal combustion engine for accommodating a wider range of running conditions. The engine includes an intake port and a first pipe type section that extends from the intake port to an end. A second inlet pipe has a first end spaced from the end of the first inlet pipe and a second end spaced a distance from the first end of the second inlet pipe. A sleeve is slightly supported over at least one end of one of the inlet pipes for movement between a first position wherein the first and second inlet pipes communicate with each other to provide a long inlet passage from the second end of the second inlet pipe to the intake port through the first inlet pipe and the second position wherein the first and second inlet pipes are out of communication with each other to provide a relatively short intake passage from the end of the first inlet pipe to the intake port.

A further feature of the invention is adapted to be embodied in a vehicle having an engine compartment defined by a downwardly sloping hood. An engine is position transversely in the engine compartment in a general upright orientation with a plurality of intake ports extending there from toward the side of the engine compartment defined by the higher portion of the hood. An air inlet device defining a plenum chamber extends above the engine and has an upper surface extending generally parallel to the hood on the underside thereof to define a high side on the intake side of the engine and a low side on the other side of the engine. The lower surface of the inlet device extends closely adjacent to the upper end of the engine to define a larger volume area on the intake side of the engine then on the other side of the engine. Inlet pipes extend from the intake ports to the error inlet device.

DETAILED DESCRIPTION OF THE PREFERRED EMBODIMENT

Figure 2:
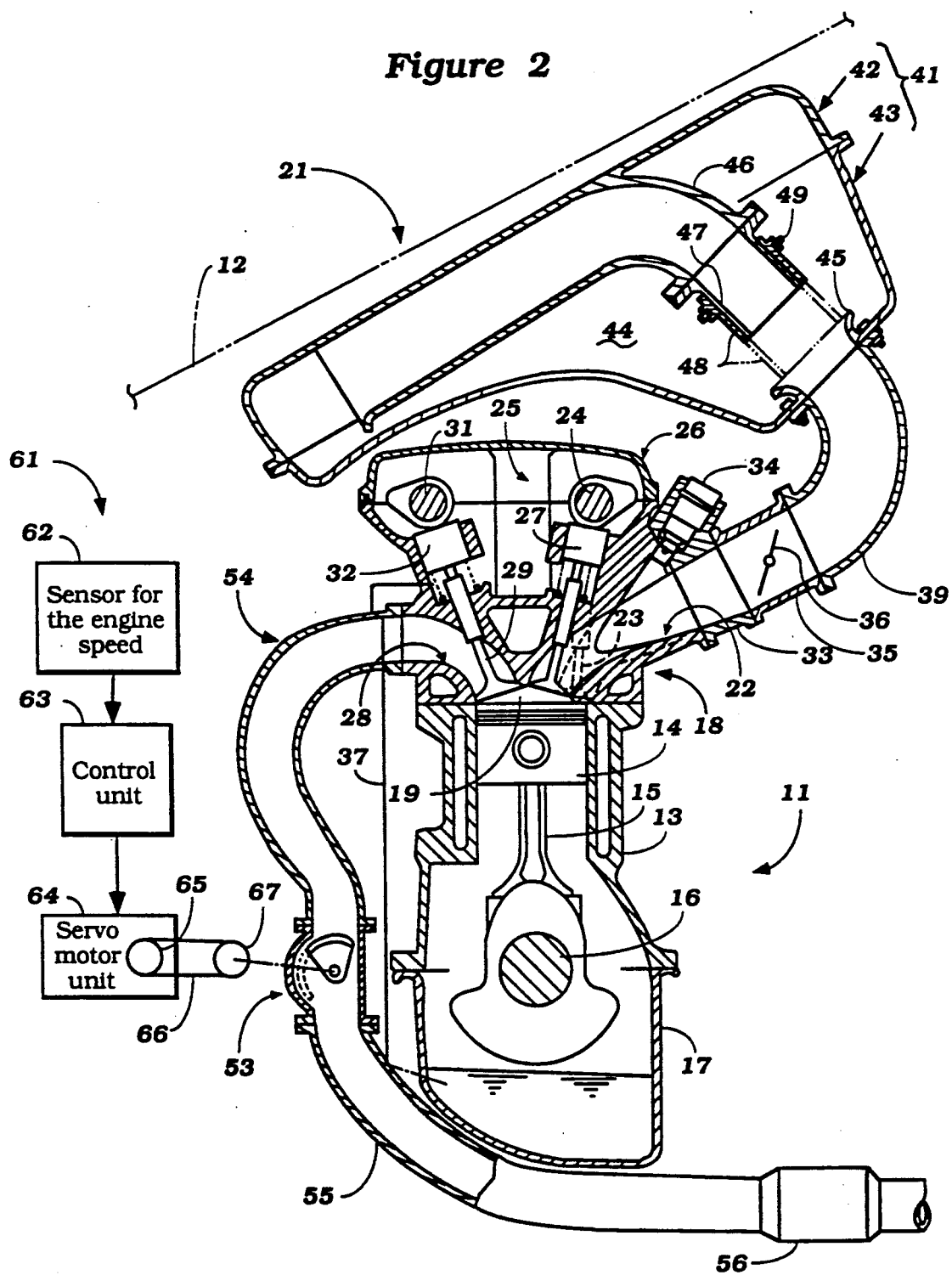
FIG. 2 is a cross sectional view taken through the engine compartment of a motor vehicle, with the motor vehicle being shown in phantom and showing certain of the control units for the engine in schematic form.

Referring now in detail to the drawings and initially to FIG. 2, an internal combustion engine constructed in accordance with an embodiment of the invention is shown in cross sections and is identified generally by the reference numeral 11. The engine 11 is, in the illustrated embodiment, of the four cylinder inline type. It is to be understood, however, that certain facets of the invention can be utilized in conjunction with other types of engines having different numbers of cylinders and different cylinder arrangements. In addition, certain features of the invention may also be employed with rotary type engines.

The engine 11 is positioned transversely in the engine compartment of a motor vehicle and which engine compartment is defined by a downwardly slopping hood 12. This type of orientation is frequently used in transverse engine, front wheel drive type vehicles. Of course, as previously noted, the invention may be employed in conjunction with other applications.

The engine 11 includes a cylinder block 13 having cylinder bores in which pistons 14 reciprocate. The pistons 14 are connected by means of connecting rods 15 to drive a crank shaft 16 that is journaled for rotation within a crank case chamber formed by the lower portion of the cylinder block 13 and a crank case 17 that is affixed there to in a known manner.

A cylinder head 18 is affixed in a known manner to the cylinder block 13 and defines individual recesses 19 that cooperate with the cylinder bores and pistons 14 to form the combustion chambers of the engine. An intake charge is delivered to these combusiton chambers from an induction system, indicated generally by the reference numeral 21 through an intake port 22 formed in the rear side of the cylinder head 18. In the illustrated embodiment, the intake port 22 terminates at three intake valves 23 that control the flow into the combustion chamber 19. Although the invention is described in conjunction with an engine having three intake valves, 23, it is to be understood, that the invention may be practiced in conjuction with engines having different numbers of intake valves.

The intake valves 23 are operated by means of an intake cam shaft 24 that is journaled for rotation within a cam chamber 258 of the cylinder head 18 which cam chamber is closed by a cam cover 26. The lobes of the intake cam shaft 24 operate the valves 23 through thimble tappets 27.

An exhaust port 28 opens through the opposite or forward side of the cylinder head 18 and a pair of exhaust valves 29 control the communication of the combustion chamber 19 with the exhaust port 28. An exhaust cam shaft 31 is journaled within the cam chamber 25 and operates thimble tappets 32 for opening the exhaust valves 29 in a known manner. The intake and exhaust cam shaft 24 and 31 are driven in a suitable manner.

An intake manifold 33 is affixed to the intake side of the cylinder head 18 and mounts a plurality of fuel injectors 34 that spray a fuel charge into the intake port 22. A throttle body 35 in which individual throttle valves 36 of the butterfly type is positioned upstream of the manifold 33 and operates to control the speed of the engine in a conventional manner. The throttle valves 36 are operated by a accelerator linkage in a well-known manner.

Figure 3:
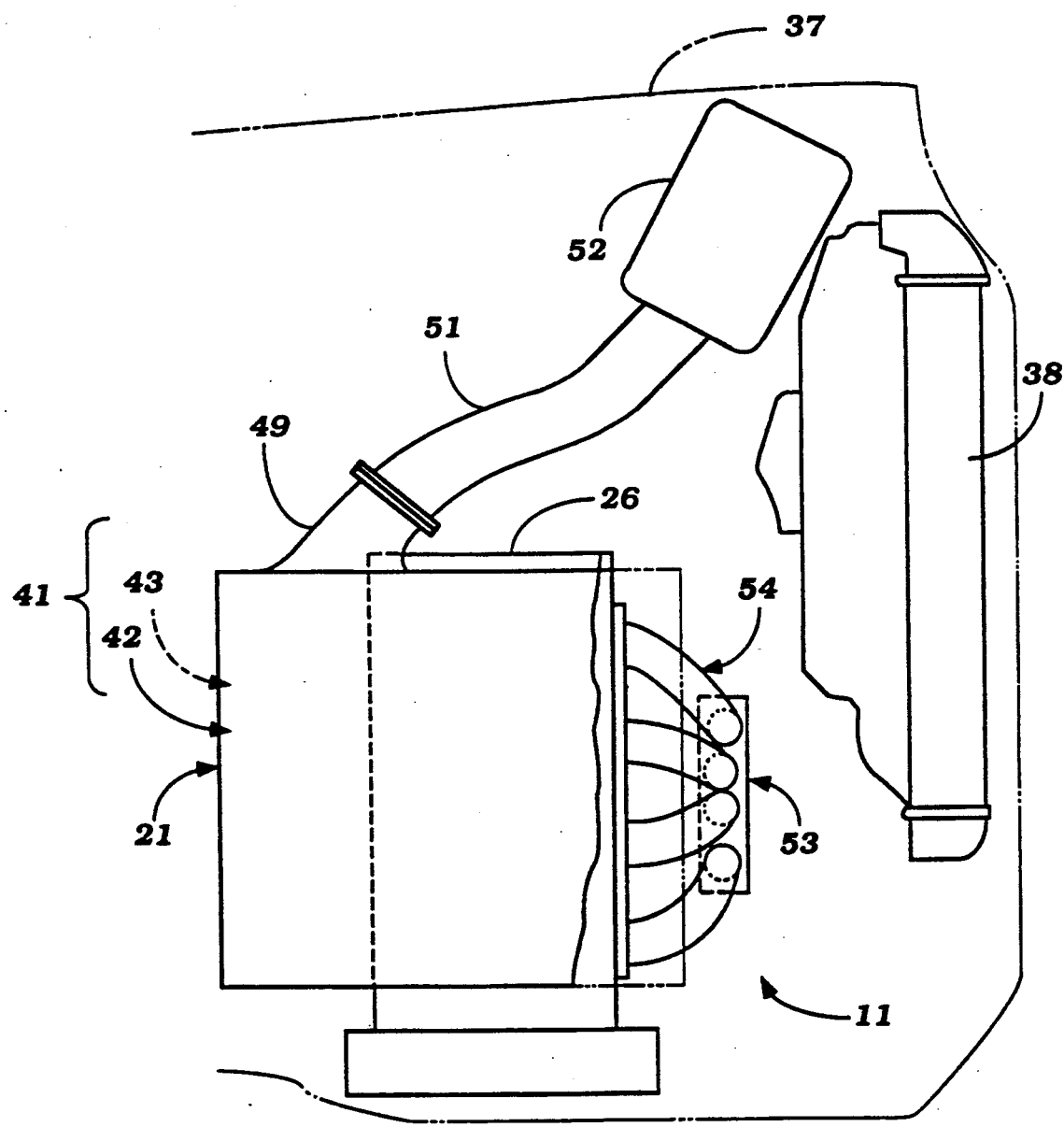
FIG. 3 is a top plan view of the motor vehicle.

Referring now additionally to FIG. 3, the transverse position of the engine 11 in the engine compartment is further shown. The engine compartment in addition to being defined by the hood 12 is defined by the fender aprons 37 of the body of the associated motor vehicle. A cooling radiator 38 is positioned forwardly of the engine 11 and immediately behind the grill opening (not shown) of the vehicle.

The induction system 21 includes a plurality of first inlet pipes 39 which are affixed to the respective ends of the throttle body 35 and have a generally right angular configuration. These inlet pipes 39 terminate within the air inlet device, indicated generally by the reference numeral 41 and which is comprised of upper housing 42 and a lower housing 43 which define and enlarge plenum volume 44. As may be readily seen in FIG. 2, the upper surface of the inlet device 41 extends generally parallel to the hood 12 and is spaced closely adjacent to it. The lower surface of the lower housing 43 lies closely adjacent the upper surface of the cam cover 26 so that the plenum volume 44 of the device 41 is substantially larger on the intake or rear side of the engine 11 then on the front side. The intake pipes 39 terminate in megaphone section 45 that extend into the lower portion of the plenum chamber 44 at this rear end.

The upper housing piece 42 is formed integrally with a plurality of second inlet pipes 6 that have a first end which is spaced from the megaphone section 45 of the first inlet pipes 39 and second end which is exposed at the forward or exhaust side of the engine. A throttle carrier 47 having a tubular configuration is affixed to and forms a portion of each the second inlet pipe and which terminates at a space distance from the megaphone section 45 as clearly shown in FIG. 2. A throttle control valve sleeve 48 is slideable supported on the carrier 47 and has a length so that it will leave the area between the megaphone section 45 and the carrier 47 open when the engine is running at high speeds and the valve sleeve 48 is in the solid line position as shown in FIG. 2. However, at low speeds, the sleeve valve 48 is slid to the phantom line position, by means of an actuator 49 that may be coupled to the throttle linkage or which may be actuated automatically, in a manner to be described. When this occurs, the effective length of the intake pipe serving the intake ports 22 will be substantially lengthened and the system will be tuned for improved low speed performance.

The air inlet device 41 has an inlet section 49 (FIG. 3) that is connected by means of a conduit 51 to an air intake and air cleaner 52 that is positioned appropriately within the engine compartment.

As has been previously noted, the sleeve throttle control valve 48 is moved between its high speed and low speed conditions depending upon the position of the throttle valves 36 either by a linkage system or by a appropriate automatic control. The induction system as thus far described will provide a torque curve as shown by the curves B1 and B2 in FIG. 1.

Figure 4:
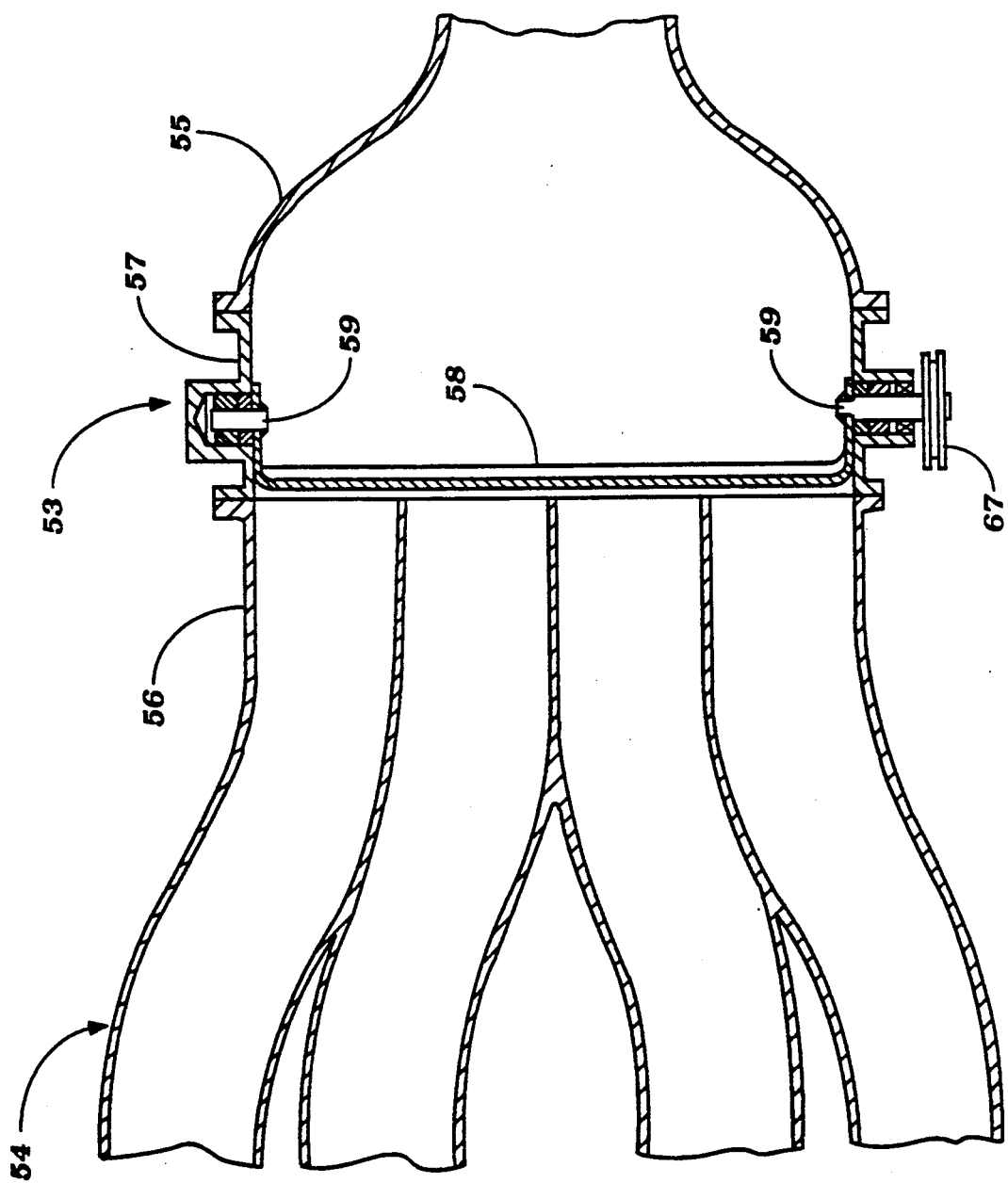
FIG. 4 is enlarged cross sectional view taken through the control valve arrangement for the exhaust system.

In order to improve the torque curve of the engine without adversely affecting the maximum performance at the speeds indicated at the speeds R1 and R2, an exhaust control valve, indicated generally by the reference numeral 53 is positioned at an appropriately length in the exhaust system between an exhaust manifold 54 and an exhaust pipe 55 in which a catalytic converter 56 and muffler (not shown) is positioned. The exhaust control valve 53 is shown in most detail in FIG. 4.

It should be noted that the exhaust manifold 54 has a plurality of individual pipes 56 that merge into a common collector section formed by the exhaust control valve 53 and specifically a control valve body 57. A control valve element 58 is journaled for rotation within the valve body 57 by means of a pair of stub shafts 59 and is moveable between a fully opened position and a partially or fully closed position wherein the valve element 58 moves into confronting relationship with individual pipes 56 of the exhaust manifold 54 so as to reflect back to the exhaust ports 28 pulses are reflected back to the exhaust port so as to provide a negative pressure at the time when the exhaust valves 29 are opened so as to improve the exhaust efficiency. It should be noted from FIG. 3 that the forward positioning of the exhaust side of the engine locates the control valve 53 in an area where it will be well cooled.

A control system, indicated generally by the reference numeral 61 and shown schematically in FIG. 2 is provided for controlling the position of the exhaust control valve assembly 53 and specifically the valve element 58. This control system includes an engine speed sensor 62 that outputs an engine speed signal to a control unit 63. The control unit 63 is programmed with a preprogrammed strategy dependent upon engine speed and, accordingly, position of the throttle valves 36 of the induction system and the slide valve 48. This control unit 63 operates a servo motor 64 which, in turn, drives a pulley 65 and belt 66. The belt 66 is trained around a pulley 67 affixed to one of the control valve stub shafts 59 so as to position the exhaust control valve element 58.

Figure 1:
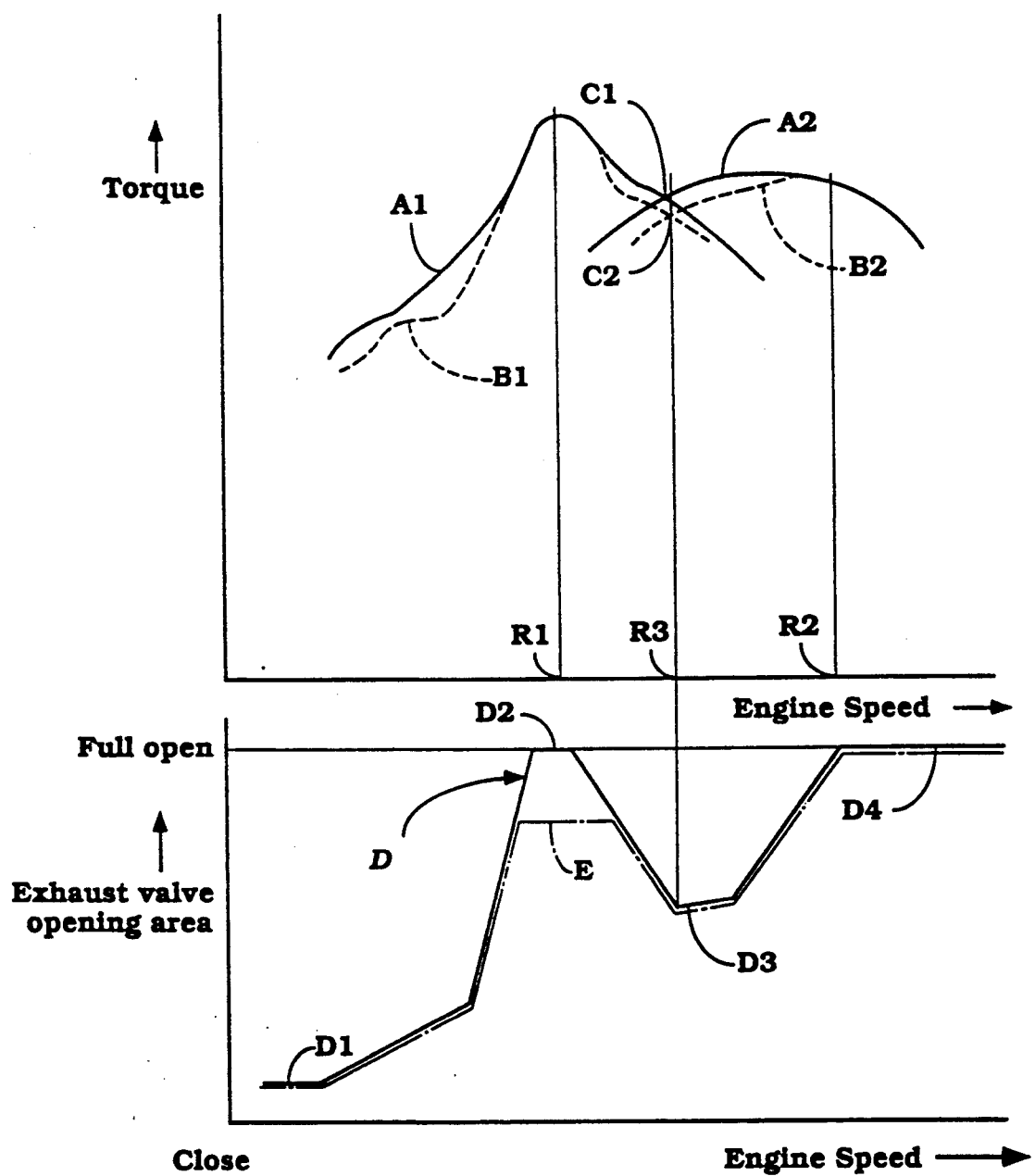
FIG. 1 is a graphical view showing the torque curve of a prior art-type of engine having a compound induction system in broken lines, the torque curve of an engine having a control valve arrangement in accordance with the invention in solid lines and the relationship of the exhaust control valve opening area to the engine speed.

FIG. 1 shows one possible strategy for operating the control valve with the curve D being shown. This shows the position of the exhaust control valve element 58 at varying speeds. At the two points when the engine induction system is tuned for maximum performance, the points R1 and R2, the exhaust control valve element 58 will be in its fully opened position as shown by the lines D2 and D4. The exhaust control valve element 58 is held in a partially closed position when the speeds are below the speed R1 and then is gradually opened and then opened more rapidly to the point D2 as the speed R1 is approached. As the speed continues to increase, then the exhaust control valve element 58 is again gradually closed to the point D3 when the two torque curves intersect at the engine speed R3. The exhaust control valve element 58 is then again opened gradually until the engine speed R2 is reached at which point the exhaust control valve element 58 is held fully opened for the remainder of the engine speed. This inter-relationship between the operation of the exhaust control valve 53 and the intake control valve 48 is effective to provide an improved torque curve as shown by the solid line curves A1 and A2. Although maximum torque is not increased, the torque at engine speeds other than the speeds R1 and R2 is increased.

Of course, varying control valve arrangements may be employed depending upon the type of engine operation. For example, with some engines it may not be desireable to fully open the exhaust control valve element 58 at the speed R1 and the curve E in FIG. 1 shows such a relationship. Of course, various other changes and modifications may be made without departing from the spirit and scope of the invention as defined by the appended claims. Also, although the invention as been described in conjunction with a two stage induction system, it is to be understood that the same principle would apply if more than two stages utilized.

I claim:

1. A control valve arrangement for improving the performance of an internal combustion engine comprising an induction system for said engine comprising at least two separately tuned inlet means each tuned to provide improved induction efficiency at a different engine speed, induction throttle valve means for controlling which of said inlet means serves said engine, an exhaust system for said engine, exhaust control valve means in said exhaust system for providing a selective reflective effect in said exhaust system, and control means for operating said exhaust control valve means to optimize performance dependant upon an engine running condition.

2. A control valve arrangement for improving the performance of an internal combustion engine as set forth in claim 1 wherein the exhaust control valve means is moved from an opened position when one of the separately tuned inlet means is operating at its tuned engine speed and is closed when operating at speeds other than tuned engine speed.

3. A control valve arrangement for improving the performance of an internal combustion engine as set forth in claim 2 wherein the exhaust control valve means is moved from its open position at speeds other than the speeds for which each of the tuned inlet means is tuned.

4. A control valve arrangement for improving the performance of an internal combustion engine as set forth in claim 3 wherein the inlet means are tuned by providing different effective lengths therefore.

5. A control valve arrangement for improving the performance of an internal combustion engine as set forth in claim 4 wherein the exhaust control valve means is moved from an opened position when one of the separately tuned inlet means is operating at its tuned engine speed and is closed when operating at speeds other than tuned engine speed.

6. A control valve arrangement for improving the performance of an internal combustion engine as set forth in claim 5 wherein the exhaust control valve means is moved from its open position at speeds other than the speeds for which each of the tuned inlet means is tuned.

7. A control valve arrangement for improving the performance of an internal combustion engine as set forth in claim 6 wherein each of the tuned inlet means opens into a plenum chamber.

8. A control valve arrangement for improving the performance of an internal combustion engine as set forth in claim 7 wherein the engine induction system includes as intake port and the first of the tuned inlet means comprises a first inlet pipe section extending from said intake port to an end within said plenum chamber and the other tuned inlet means comprises a second inlet pipe having a first end spaced from the end of the first inlet pipe and within the plenum chamber and a second spaced a distance from the first end of the second inlet pipe and opening within the plenum chamber and wherein the induction throttle valve means comprises a slide type valve received upon one end of one of said inlet pipes and moveable between a first position wherein said first and said second inlet pipes are out of communication with each other to provide a short intake passage from said plenum chamber to said intake port through said first inlet pipe and a second position wherein the said first and said second inlet pipes communicate with each other to provide a long intake passage from said second end of said second inlet pipe to said intake port through said first inlet pipe.

9. A control valve arrangement for improving the performance of an internal combustion engine as set forth in claim 8 wherein the engine is a multiple cylinder engine having induction systems and exhaust systems as described for each cylinder and is positioned transversely in an engine compartment having a downwardly sloping hood with the plenum chamber being disposed beneath the hood and above the engine.

10. A control valve arrangement for improving the performance of an internal combustion engine as set forth in claim 9 wherein the plenum chamber is defined by an upper surface extending substantially parallel to and beneath the lower surface of the hood to define a larger effective area on one side of the engine than on the other side.

11. A control valve arrangement for improving the performance of an internal combustion engine as set forth in claim wherein each of the tuned inlet means opens into a plenum chamber.

12. A control valve arrangement for improving the performance of an internal combustion engine as set forth in claim 11 wherein the engine induction system includes an intake port and the first of the tuned inlet means comprises a first inlet pipe section extending from said intake port to an end within said plenum chamber and the other tuned inlet means comprises a second inlet pipe having a first end spaced from the end of the first inlet pipe and within the plenum chamber and a second spaced a distance from the first end of the second inlet pipe and opening within the plenum chamber and wherein the induction throttle valve means comprises a slide type valve received upon one end of one of said inlet pipes and moveable between a first position wherein said first and second inlet pipes are out of communication with each other to provide a short intake passage from said plenum chamber to said intake port through said first inlet pipe and a second position wherein the said first and said second inlet pipes communicate with each other to provide a long intake passage from said second end of said second inlet pipe to said intake port through said first inlet pipe.

13. A control valve arrangement for improving the performance of an internal combustion engine as set forth in claim 12 wherein the engine is a multiple cylinder engine having induction systems and exhaust systems as described for each cylinder and is positioned transversely in an engine compartment having a downwardly sloping hood with the plenum chamber being disposed beneath the hood and above the engine.

14. A control valve arrangement for improving the performance of an internal combustion engine as set forth in claim 1 wherein the engine is a multiple cylinder engine having induction systems and exhaust systems as described for each cylinder and is positioned transversely is an engine compartment having a downwardly sloping hood with the plenum chamber being disposed beneath the hood and above the engine.

15. A control valve arrangement for improving the performance of an internal combustion engine as set forth in claim 14 wherein the plenum chamber is defined by an upper surface extending substantially parallel to and beneath the lower surface of the hood to define a larger effective area on one side of the engine than on the other side.

16. A vehicle having an engine compartment defined by a downwardly sloping hood, an engine positioned transversely in said engine compartment in a generally upright orientation with a plurality of intake ports extending there from toward the side of said engine compartment defined by the higher portion of said hood, an air inlet device defining a plenum chamber extending above said engine and having an upper surface extending generally parallel to said hood on the underside thereof to define a high side on the intake side of said engine and a low side on the other side of said engine, the lower surface of said air inlet device extending closely adjacent the upper surface of said engine to define a larger volume area on the intake side of said engine than on the other side of said engine, and intake pipes extending from said intake ports to said air inlet device.

17. A vehicle as set forth in claim 16 wherein said intake pipe or pipes each comprise two separately tuned intake pipes each tuned to provide improved induction efficiency at a different engine speed and induction throttle valve means for controlling which of said inlet means serves said engine.

18. A vehicle engine as set forth in claim 17 wherein comprise a first inlet pipe section extending from the intake port to an end within the plenum chamber and a second inlet pipe having a first end spaced from the end of the first inlet pipe and within the plenum chamber and a second end spaced a distance from the first end of the second inlet pipe and opening within said plenum chamber and induction throttle valve means comprising a slide type valve received upon one end of one of said inlet pipes and moveable between a first position wherein said first and said second inlet pipes are out of communication with each other to provide a short intake passage from said plenum chamber to said intake port through said first inlet pipe and a second position wherein the said first and said second inlet pipes communicate with each other to provide a long intake passage from said second end of said second inlet pipe to said intake port through said first inlet pipe.

* * * * *

UNITED STATES PATENT AND TRADEMARK OFFICE
CERTIFICATE OF CORRECTION

PATENT NO. : 5,092,284

DATED : March 3, 1992

INVENTOR(S) : Tetsuro Yamada

It is certified that error appears in the above-identified patent and that said Letters Patent is hereby corrected as shown below:

Column 6, line 53, Claim 4, "therefore" should be --therefor--.

Column 7, line 6, Claim 8, "as" should be --an--.

Column 7, line 42, Claim 11, after "claim" insert --1--.

Column 7, line 58, Claim 12, after "and" insert --said--.

Column 8, line 14, Claim 14, "is" should be --in--.

Column 8, line 28, Claim 16, "there from" should be --therefrom--.

Column 8, line 42, Claim 17, delete "pipe or".

Column 8, line 47, Claim 18, delete "engine".

Column 8, line 47, Claim 18, after "wherein" insert --said intake pipes--.

Signed and Sealed this

Seventh Day of September, 1993

Attest:

BRUCE LEHMAN

*Attesting Officer*  *Commissioner of Patents and Trademarks*